United States Patent [19]
Wang

[11] Patent Number: 5,943,813
[45] Date of Patent: Aug. 31, 1999

[54] ENCLOSING MOUSETRAP

[76] Inventor: Ching-Long Wang, No. 192, Hai Pin Road, Ching Shui Chen, Taichung Hsien, Taiwan

[21] Appl. No.: 08/893,363

[22] Filed: Jul. 15, 1997

[51] Int. Cl.$^6$ .................................................. A01M 23/18
[52] U.S. Cl. .................................................... 43/61
[58] Field of Search .......................................... 43/60, 61

[56] References Cited

U.S. PATENT DOCUMENTS

| | | | |
|---|---|---|---|
| 1,645,444 | 10/1927 | Moore | 43/61 |
| 1,765,081 | 6/1930 | Lee | 43/61 |
| 2,616,210 | 11/1952 | Reeb | 43/61 |
| 2,683,951 | 7/1954 | Hamaker | 43/61 |
| 5,067,271 | 11/1991 | Henning | 43/61 X |

*Primary Examiner*—Robert P. Swiatek
*Attorney, Agent, or Firm*—Smith, Gambrell & Russell, LLP; Beveridge, DeGrandi, Weilacher & Young & Intellectual Property Group

[57] ABSTRACT

An enclosing mousetrap includes a tubular housing, trap plates at each end, and a hanging hook for connecting the trap plates to the tubular housing. The ends of the tubular housing and the trap plates each contain a pair of holes through which the hanging hooks are engaged to connect the trap plates to the tubular housing. The extended end legs of the hanging hooks clip over cutouts formed in the rim of the tubular housing. The trap plates each have a curved shape and freely swing inward to allow a mouse to have easy access into the interior of the tubular housing. Once inside, however, the mouse cannot exit the tubular housing because the first and second trap plates are disposed such that when the trap plates are pushed outward with respect to the interior of the tubular housing, a lower periphery of the trap plates engages with an inner wall of the tubular housing, which stops the trap plates from swinging outside the tubular housing. The mousetrap also may include a supporting bracket to hold it in an upright position, even when a mouse is trapped inside. This supporting bracket can take on a variety of forms. For example, a pair of legs for supporting the tubular housing may extend along the length of the tubular housing. In another embodiment, a pair of supporting brackets, each including a mounting hoop and a pair of extending legs, is provided for receiving and supporting the tubular housing.

3 Claims, 3 Drawing Sheets

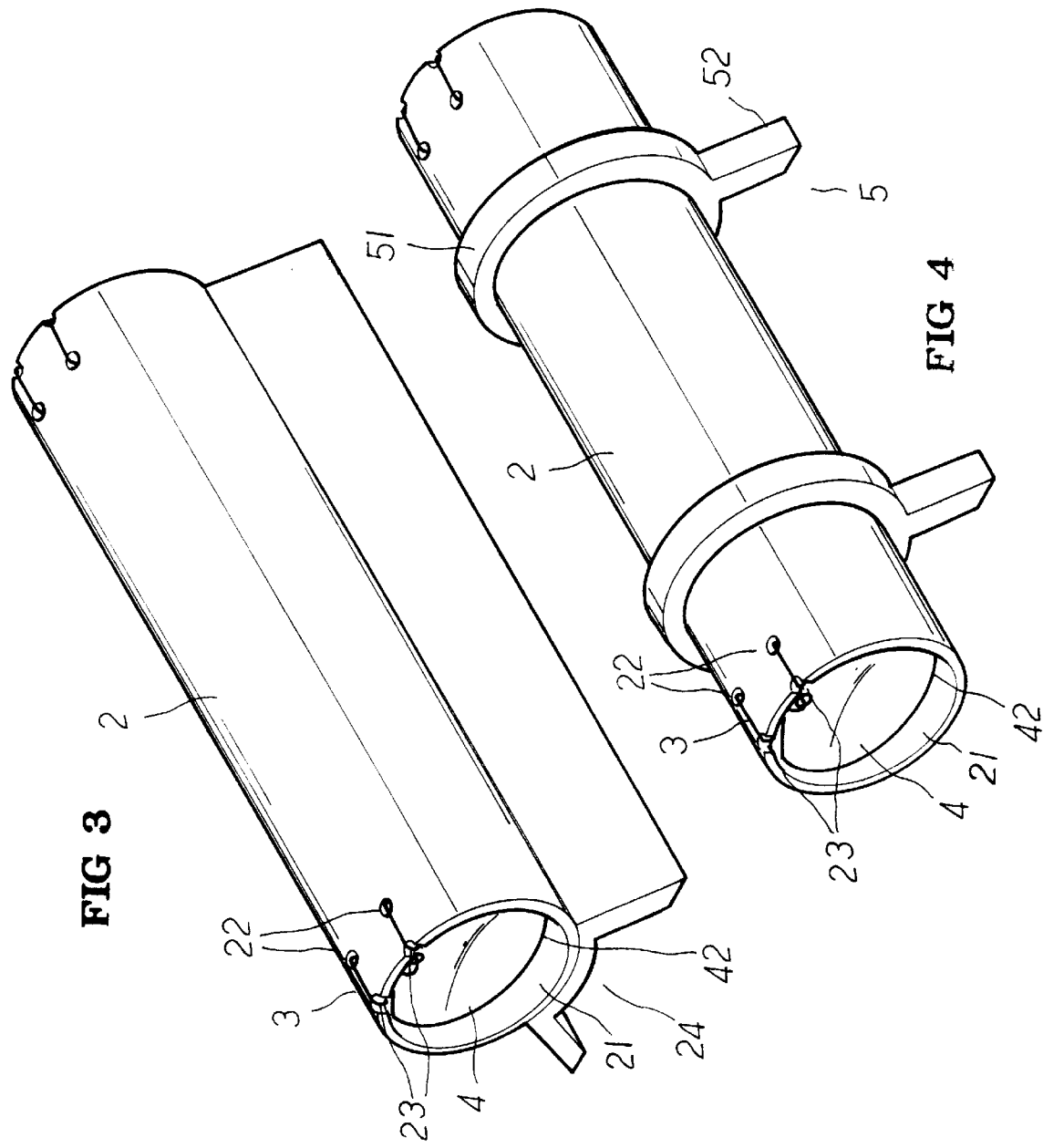

ENCLOSING MOUSETRAP

FIELD OF THE INVENTION

The present invention relates to a trap, more particularly, to a mousetrap which can be readily disposed indoors and/or outdoors such that a mouse can be readily trapped. The enclosing trap is configured with a tubular housing having a trap plate disposed at both ends by means of a hanging hook. The U-shaped portion of the hanging hook can be suitably mounted onto the trap plate by passing the extended legs, the hook portions, and the curved portions through the through holes of the trap plate. The tip of the extended legs of the hanging hook is further deformed such that the hanging hook is clipped onto the rim of the tubular housing. In setting the enclosing mousetrap, the mounting holes of the tubular housing are directed upward such that the trap plates are free to swing toward the inner space of the tubular housing. The tubular housing can be suitably buried underground to trap a mouse which is carelessly digging a tunnel. The trap plate is specially designed such that when the trap plate is biased outward by a trapped mouse, a locked engagement between the lower periphery of the trap plate and the inner wall of the tubular housing will be established. Consequently, once a mouse is trapped, the trapped mouse has no chance to escape therefrom. The tubular housing can also be supported by a supporting bracket having a pair of extending legs. By this arrangement, the tubular housing can be disposed on the floor to trap a mouse. Since the tubular housing is firmly supported by the supporting bracket, even when a mouse is trapped, the tubular housing is firmly supported without rolling. In a variant of the supporting bracket, a mounting hoop is provided such that the tubular housing can be fixedly inserted therein. The overall configuration is simple and easy to manufacture at a low cost.

DESCRIPTION OF THE PRIOR ART

The mouse population is increasing very fast, and almost every corner of the world has mice. Not only will the mice cause a great deal of crop loss, but they also will spread some diseases since mice are carriers of certain bacteria. Destroying or controlling the population of mice is a great task, especially in third world countries.

In order to destroy or decrease the population of mice, a plurality of measures have been introduced, such as poisonous bait, adhesive paper, mousetraps (cages), etc. However, poisonous bait is not suitable for family usage since the dead mouse body is difficult to handle. Moreover, the unpleasant odor of a dead mouse body is really not acceptable to people, and this will also bring a negative influence to the environment. Furthermore, poisonous bait is a potential and dangerous risk for children. If poisonous bait is swallowed by young children, the child may die.

Adhesive paper is only effective against small mice, and it is not effective against adult mice. Moreover, adhering paper is only workable at indoor locations, and it is not suitable for outdoor usage.

The most popular conventional mousetraps can be divided into the following types:

1. Tunnel type. The trap doors are actuated by a spring member so the entrance can be blocked. In setting the mousetrap, the trap doors are kept in an opened condition by means of a supporting arm. Once the pedal is stepped on by a mouse, the trap doors are released by the supporting arm, and then the trap doors return to their closed positions by the spring force. However, this tunnel type mousetrap has a bulky size and a complicated configuration. The overall size is increased when both doors are opened. In light of this, the applications for this device are limited. Moreover, the opening of the trap door must be carefully manipulated since the linkage between the pedal and the supporting arm is very sensitive. The trap doors can be readily triggered to close as the pedal is moved or a vibration is applied to the mousetrap. If the trap doors are closed accidentally, the fingers of the user may be clipped and an injury will be experienced. In light of this, the manipulation of this mousetrap is inconvenient and potentially dangerous. Furthermore, after a period of time, the spring will experience fatigue such that the trap doors can not be effectively closed. Even when a mouse is trapped, it may easily escape therefrom as the spring force can be readily overcome.

2. Mousetraps having a one-way passage. This conventional mousetrap is made from plastic material and is configured with a housing, a closing element, and a trap door. The trap door is pivotally attached to the opening of the housing by means of a pin shaft. The housing is provided with a projected rib above the trap door such that the trap door can be swung toward the inner space of the housing while the trap door can not be swung backward/outward. Once the mouse passes through the trap door, it is trapped without the possibility of escaping through the trap door. The trap door is provided with a plurality of openings from which the smell of bait disposed within the housing can ventilate outward.

However, the possibility of trapping a mouse by this mousetrap is low as it takes a single-way passage design. The trap door is provided with a projected rib to prevent the trap door from swinging outward, and because the gap between the lower edge of the trap door and the projected rib above the trap door is comparatively large, the "torque" is also comparatively large. Once the mouse is trapped, the mouse may readily bump an escaping gap under the trap door by means of the "torque". Additionally, in order to facilitate easy mounting of the pin shaft and the shaft hole, the pin shaft disposed at both sides of the trap door can not be extended to a longer length. In light of this, the durability and the strength between the pin shaft and the shaft hole is not durable. Moreover, the usage of this mousetrap has some defects also.

SUMMARY OF THE INVENTION

It is one objective of this invention to provide an enclosing mousetrap by which mice both on a surface and underground can be readily and securely trapped.

In order to achieve this objective, an enclosing mousetrap comprises a tubular housing defining an inlet/outlet at both ends. The wall of the tubular housing is provided with a pair of mounting holes which are spaced apart from each other. The rim portion of the tubular housing is provided with a pair of cutouts. A pair of hanging hooks are formed by bending a steel wire. The steel wire is first formed with a U-shaped portion, and then a small curved portion is formed. A hook portion is extended from the curved portion. Each of the hook portions is further provided with an extended leg for positioning and disposing onto the mounting holes of the tubular housing. Additionally, a pair of trap plates are formed with a curved shape and can be movably disposed within the tubular housing by means of the hanging hooks. The periphery of the trap plate is provided with a pair of through holes which are spaced apart from each other such that the U-shaped portion of the hook can be suitably mounted onto the trap plate by passing the extended leg, the hook portion, and the curved portion through the through hole. When the extended legs are anchored onto the cutout of the tubular housing, the tips of the extended legs are further moved downward such that the extended legs are clipped onto the cutouts of the tubular housing. When the trap plate is disposed such that the trap plate is biased outward, a locked engagement will be established between the lower periphery of the trap plate and the inner wall of the tubular housing. The enclosing mousetrap can be buried underground such that a mouse can be easily trapped when it is carelessly digging a tunnel underground.

According to another aspect of the present invention, the tubular housing can be well supported by a supporting bracket having a pair of extended legs so that the tubular housing will not roll even if a mouse is trapped therein. This is specially suitable for surface application both indoors and/or outdoors. In a variant of the supporting bracket, a mounting hoop is provided on the bracket, and the tubular housing can be suitably mounted within the mounting hoop.

The overall manufacturing cost of this mousetrap device is comparatively low, and mice can be effectively trapped therein.

The enclosing mousetrap is specially suitable for farm applications where a large mouse population is found.

BRIEF DESCRIPTION OF THE DRAWINGS

In order that the present invention may be more readily understood, the following description is given, merely by way of example, with reference to the accompanying drawings, in which:

FIG. 3 is a perspective view of another embodiment of the enclosing mousetrap; and FIG. 4 is a perspective view of still another embodiment of the enclosing mousetrap.

DETAILED DESCRIPTION OF THE PREFERRED EMBODIMENTS

Figure 1:
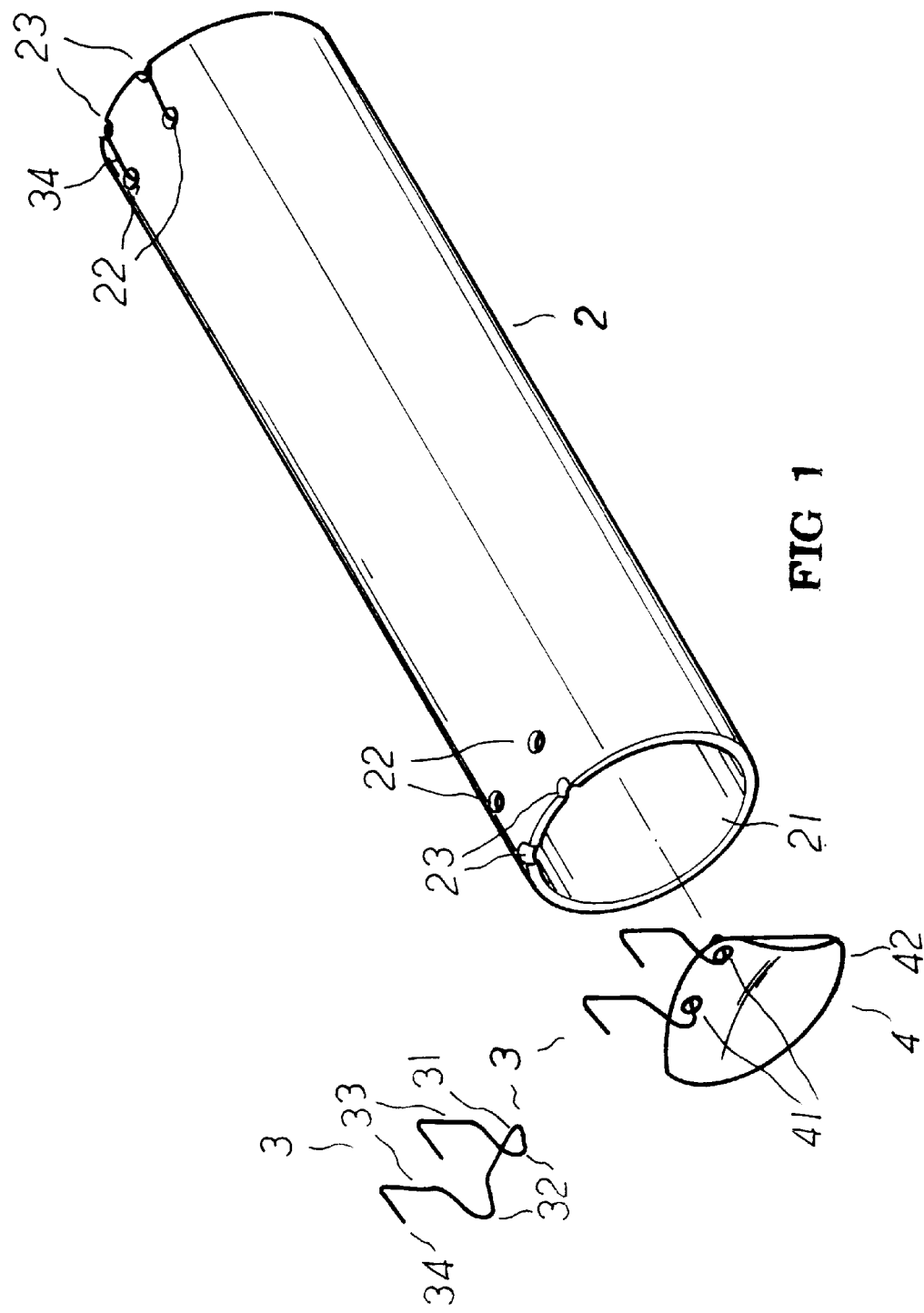
FIG. 1 is an exploded perspective view of the enclosing mousetrap made according to the present invention.
Figure 2:
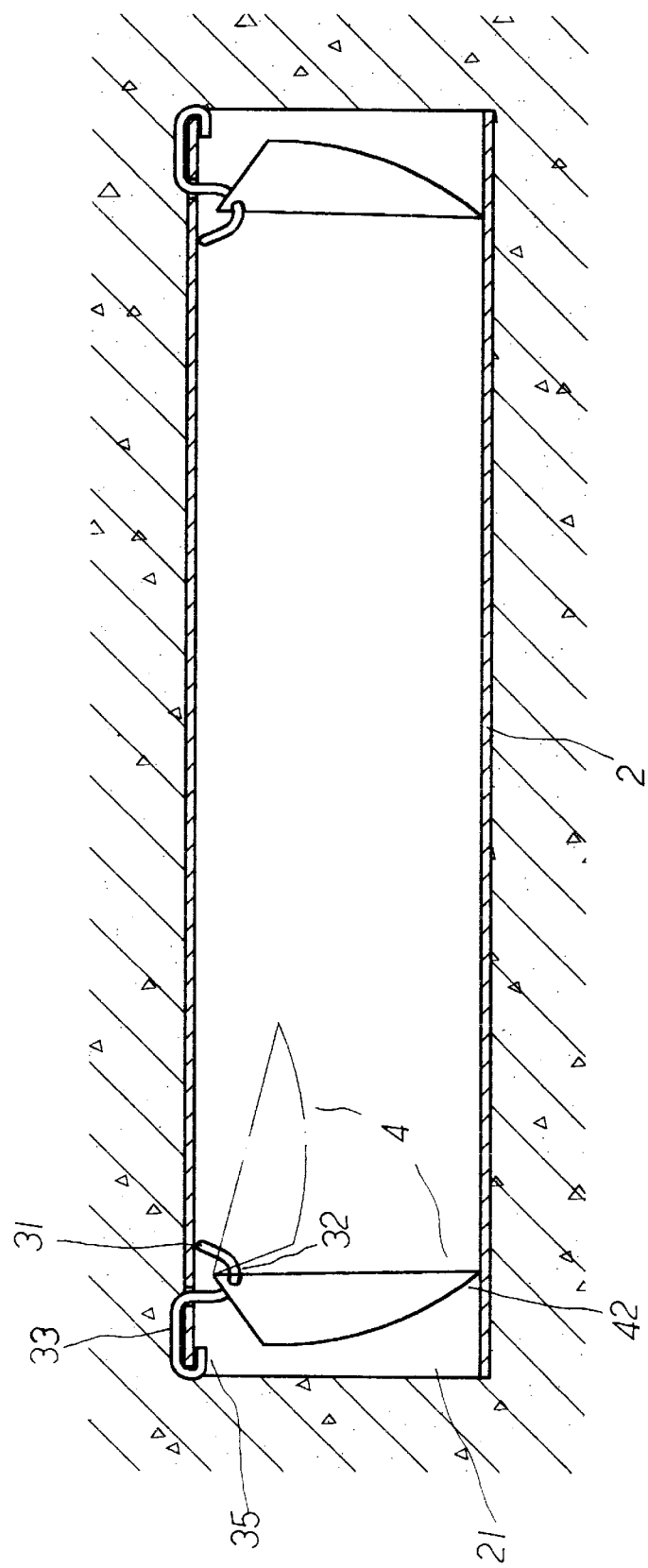
FIG. 2 is a cross sectional view of the enclosing mousetrap.

Referring to FIGS. 1 and 2, the enclosing mousetrap made according to the present invention generally comprises a tubular housing 2, a pair of hanging hooks 3, and a pair of trap plates 4 which are opened only toward the inner space of the tubular housing 2. The tubular housing 2 is defined with an inlet/outlet 21 at both ends. The wall of the tubular housing 2 is provided with a pair of mounting holes 22 which are spaced apart from each other. The rim portion of the tubular housing 2 is provided with a pair of cutouts 23, and each of the cutouts 23 is aligned with a mounting hole 22.

The hanging hook 3 is formed by bending a steel wire. The steel wire is first formed with a U-shaped portion 31, and then a small curved portion 32 is formed, Finally, a hook portion 33 is extended from the curved portion 32. Each of the hook portions 33 is further provided with an extended leg 34 for positioning and disposing onto the mounting holes 22 of the tubular housing 2.

Each of the trap plates 4 is formed with a curved shape and can be movably received within the tubular housing 2. The periphery of the trap plate 4 is provided with a pair of through holes 41 which are spaced apart from each other such that the U-shaped portion 31 of the hook 3 can be suitably mounted onto the trap plate 4 by passing the extended legs 34, the hook portions 33, and the curved portions 32 through the through holes 41.

In mounting the trap plate 4 and the hook 3 onto the tubular housing 2, the extended legs 34, the hook portions 33, and the curved portions 32 are passed through the mounting holes 22 sequentially such that the trap plate 4 is movably disposed within the tubular housing 2. Then the extended legs 34 are further moved downward such that each extended leg 34 is anchored onto the cutout 23 of the tubular housing 2. The free tips 35 of the extended legs 34 can be further bent to fix the extended legs 34 to the housing 2.

In setting the enclosing mousetrap, bait can be first disposed within the tubular housing 2, and then the tubular housing 2 can be buried into the ground such that the mounting holes 22 are directed upward. Afterward, the top of the tubular housing 2 can be covered with soil, as shown in FIG. 2. Since mice tend to dig holes, they can be readily trapped within the tubular housing 2. When the mouse is digging a hole or a channel, the mouse may easily penetrate the trap plate 4 which can be readily swivelled inward, as shown by the dotted line in FIG. 2. After the mouse passes over, the trap plate 4 is closed downward again, and the mouse is trapped within the tubular housing 2. If the mouse attempts to escape from the housing 2, the bottom rim of the trap plate 4 is blocked by the inner wall of the tubular housing 2, and the engagement between the trap plate 4 and the inner wall of the tubular housing 2 becomes tighter and tighter. As a result, the trapped mouse cannot escape from the trap. In light of this, this trap is specially suitable for application on farms or outdoors.

In another embodiment, the tubular housing 2 can also be supported by a supporting bracket having two supporting legs 24, as clearly shown in FIG. 3. The two supporting legs 24 open widely such that the tubular housing 2 can be firmly supported without rolling even with a mouse trapped therein. Again, when the supporting bracket (including legs 24) is attached to the tubular housing 2, the mounting holes 22 are still directed upward such that the trap plates 4 are free to move inward, and when a trapped mouse attempts to escape therefrom, a firm engagement between the lower periphery of the trap plate 4 and the inner wall of the tubular housing 2 prevents escape.

As shown in FIG. 4, in an alternative to the supporting bracket 24, a pair of supporting brackets 5, each having a mounting hoop 51, is provided. In this embodiment, the tubular housing 2 can be readily inserted into the mounting hoops 51 in an interference engagement manner, and then the tubular housing 2 can also be supported by the extending legs 52 of the supporting brackets 5. By the extending legs 52, the tubular housing 2 is well supported even when a mouse is trapped therein. In this embodiment, the mounting holes 22 of the tubular housing 2 are also directed upward such that the trap plates 4 are free to swing toward the inner space of the tubular housing 2 while the lower periphery of the trap plate 4 will be blocked by the inner wall of the tubular housing 2 when the trap plate 4 is biased outward by the trapped mouse.

From the foregoing description, it can be readily appreciated that the enclosing mousetrap can be disposed both indoors and/or outdoors for trapping mice. Moreover, it can also be buried underground to trap a mouse which is digging a tunnel or hole.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. An enclosing mousetrap, comprising:
   (A) a tubular housing having a first end and a second end, wherein a first inlet is defined at the first end of the tubular housing and a second inlet is defined at the second end of the tubular housing, and wherein:
   the first end of the tubular housing has a first mounting hole and a second mounting hole defined therein, wherein the first mounting hole and the second mounting hole are spaced apart from one another, and wherein a rim portion of the first end includes a first cutout and a second cutout defined therein; and
   the second end of the tubular housing has a third mounting hole and a fourth mounting hole defined therein, wherein the third mounting hole and the fourth mounting hole are spaced apart from one another, and wherein a rim portion of the second end includes a third cutout and a fourth cutout defined therein;
   (B) a first trap plate movably disposed at the first end of the tubular housing, wherein the first trap plate has a curved shape, and wherein a periphery of the first trap plate includes a first through hole and a second through hole defined therein, wherein the first through hole and the second through hole are spaced apart from one another;
   (C) a second trap plate movably disposed at the second end of the tubular housing, wherein the second trap plate has a curved shape, and wherein a periphery of the second trap plate includes a third through hole and a fourth through hole defined therein, wherein the third through hole and the fourth through hole are spaced apart from one another;
   (D) a first hanging hook for movably connecting the first trap plate at the first end of the tubular housing, wherein the first hanging hook includes a bent wire, wherein the first hanging hook includes:
   a U-shaped portion,
   a first curved portion extending from the U-shaped portion,
   a first hook portion extending from the first curved portion,
   a first extended leg extending from the first hook portion,
   a second curved portion extending from the U-shaped portion,
   a second hook portion extending from the second curved portion, and
   a second extended leg extending from the second hook portion,
   wherein the first extended leg, the first hook portion, and the first curved portion of the first hanging hook extend through the first through hole of the first trap plate,
   wherein the second extended leg, the second hook portion, and the second curved portion of the first hanging hook extend through the second through hole of the first trap plate,
   wherein the first extended leg extends through the first mounting hole and around the first cutout of the tubular housing, and
   wherein the second extended leg extends through the second mounting hole and around the second cutout of the tubular housing; and
   (E) a second hanging hook for movably connecting the second trap plate at the second end of the tubular housing, wherein the second hanging hook includes a bent wire, wherein the second hanging hook includes:
   a U-shaped portion,
   a third curved portion extending from the U-shaped portion,
   a third hook portion extending from the third curved portion,
   a third extended leg extending from the third hook portion,
   a fourth curved portion extending from the U-shaped portion,
   a fourth hook portion extending from the fourth curved portion, and
   a fourth extended leg extending from the fourth hook portion,
   wherein the third extended leg, the third hook portion, and the third curved portion of the second hanging hook extend through the third through hole of the second trap plate,
   wherein the fourth extended leg, the fourth hook portion, and the fourth curved portion of the second hanging hook extend through the fourth through hole of the second trap plate,
   wherein the third extended leg extends through the third mounting hole and around the third cutout of the tubular housing, and
   wherein the fourth extended leg extends through the fourth mounting hole and around the fourth cutout of the tubular housing; and
   wherein the first and second trap plates are disposed such that when the trap plates are pushed outward with respect to an interior of the tubular housing, a lower periphery of the first and second trap plates engages with an inner wall of the tubular housing.

2. An enclosing mousetrap as recited in claim 1, further including a supporting bracket having a pair of extending legs for supporting the tubular housing such that the first, second, third, and fourth mounting holes of the tubular housing are located above the pair of extending legs so that the first and second trap plates are free to swing into the tubular housing.

3. An enclosing mousetrap as recited in claim 1, further including:
   a first supporting bracket including a first mounting hoop for receiving the tubular housing and a first pair of extending legs; and
   a second supporting bracket including a second mounting hoop for receiving the tubular housing and a second pair of extending legs.

* * * * *